United States Patent [19]

Moore et al.

[11] E Re. 31,382

[45] Reissued Sep. 13, 1983

[54] STATIC CHARGE NEUTRALIZER AND PROCESS

[75] Inventors: Edward J. Moore, Florence, S.C.; John E. Owens, Hockessin, Del.

[73] Assignee: E. I. Du Pont de Nemours and Company, Wilmington, Del.

[21] Appl. No.: 253,807

[22] Filed: Apr. 13, 1981

Related U.S. Patent Documents

Reissue of:

[64] Patent No.: 4,110,810
Issued: Aug. 29, 1978
Appl. No.: 776,231
Filed: Mar. 10, 1977

[51] Int. Cl.[3] ..... H05F 3/04
[52] U.S. Cl. ..... 361/213
[58] Field of Search ..... 361/214, 222, 212, 213, 361/220; 355/3 CH

[56] References Cited

U.S. PATENT DOCUMENTS

| | | | |
|---|---|---|---|
| 983,536 | 2/1911 | Chapman | 361/213 |
| 1,207,862 | 12/1916 | Chapman | 361/213 |
| 1,782,712 | 11/1930 | Chapman | 361/214 |
| 2,752,533 | 6/1956 | Maas | 361/213 |
| 3,474,292 | 10/1969 | Carter | 361/213 |
| 3,634,726 | 1/1972 | Jay | 361/220 |
| 3,790,854 | 2/1974 | Dryczynski | 361/213 |
| 4,027,201 | 5/1977 | Bacon et al. | 361/213 |

FOREIGN PATENT DOCUMENTS

| | | | |
|---|---|---|---|
| 2313933 | 9/1974 | France | 361/212 |
| 1429821 | 3/1976 | United Kingdom . | |

*Primary Examiner*—J. D. Miller
*Assistant Examiner*—L. C. Schroeder

[57] ABSTRACT

A device is disclosed for neutralizing static charge generated in a moving web of dielectric material. A conductive bare wire is impressed with an AC voltage of 3000 to 10,000 volts at a frequency of 40–70 Hertz and located near the web.

13 Claims, 2 Drawing Figures

STATIC CHARGE NEUTRALIZER AND PROCESS

Matter enclosed in heavy brackets [ ] appears in the original patent but forms no part of this reissue specification; matter printed in italics indicates the additions made by reissue.

Handling webs of dielectric film material generates static electric charge in the material. Such static charge causes difficulty in further processing such as in rolling, slitting or using the web. Neutralization of static charges on the surface of moving webs of film material has long been a goal of workers in this field.

Charge neutralizing devices have been disclosed wherein fine wire electrodes are located in proximity to the web material to be acted upon. U.S. Pat. No. 777,598 discloses removal of static charge by transport of a web of dielectric material past a wire electrode having a high electrical potential. Voltage impressed on the wire electrode is disclosed to be high enough to spark across about three-quarters of an inch. The voltage is generated by a Tesla coil at the high frequency characteristic of such a device.

U.S. Pat. No. 983,536 discloses a static neutralizing device wherein an insulated conductor with large surface area is positioned over a moving web of dielectric material and is impressed with a high AC voltage. The voltage is disclosed to create an electrostatic field through which the web material is passed and in which is located an uninsulated fine wire ground conductor. The ground conductor is required for operation of the device.

U.S. Pat. No. 3,364,726 discloses a static neutralizing device wherein an insulated fine wire electrode is impressed with AC voltages at various frequencies ranging from 300 to 2000 Hertz depending upon the speed of the web material to be neutralized. The fine wire electrode is required to be positioned very near to the moving web and there is also a requirement for a conductive metallic ground bar to be positioned nearby.

This invention relates to neutralizing static charges on a fast moving web of dielectric material. The neutralizing is accomplished by impressing an alternating current (AC) voltage at a low frequency on a fine conductive bare wire located near to the moving web. Such an arrangement permits successful high speed operation using a low frequency voltage source. Accordingly, there is provided a static charge neutralizing device for dielectric web material comprising means for continuously moving the web material in a predetermined path; conductive bare wire less than 0.030 cm (12 mils) in diameter extending across and parallel with the web material and located from 0.6 to 8.0 cm (¼ to 3 inches) from the web material; and means for impressing an AC voltage on the wire of from 3000 to 10,000 volts at 40 to 70 Hertz.

As applied specifically to winding rolls of dielectric web material, there is provided a web winding device for a dielectric web material comprising a driven winding roll onto which the web is wound; a nip roll in pressure contact with the web wound on the winding roll and at which point of pressure contact the web is first laid onto the winding roll; a conductive bare wire less than 0.030 cm (12 mils) in diameter extending across and parallel with the web and located from 0.6 to 8.0 cm (¼ to 3 inches) from the web material on the winding roll in an arc of 0° to 90° after contact by the nip roll; and means for impressing and AC voltage on the wire of from 3000 to 10,000 volts at 40 to 70 Hertz.

The invention includes a process for continually neutralizing static charge on dielectric film material comprising moving the web material in a predetermined path 0.6 to 8.0 cm (¼ to 3 inches) from a conductive bare wire less than 0.030 cm (12 mils) in diameter extending across and parallel with the web material, and impressing an AC voltage on the wire of from 3000 to 10,000 volts at 40 to 70 Hertz.

Important and critical elements in operation of the present invention include the use of a fine bare, conductive wire impressed with an AC, low frequency, voltage adequate to initiate corona discharge but not exceeding that which will cause sparking.

Figure 1:
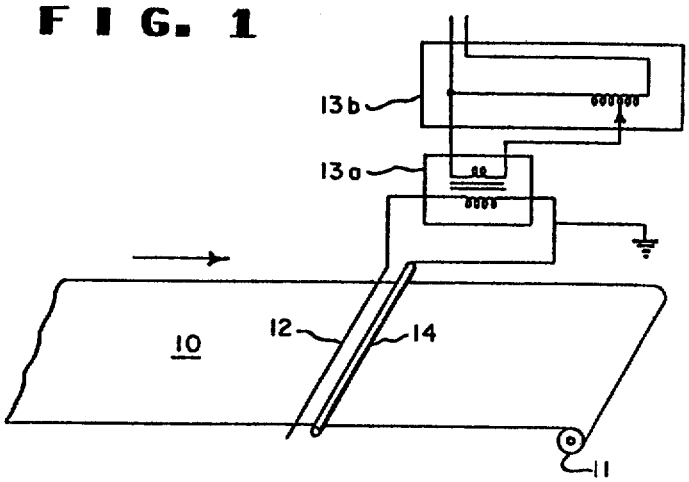
FIG. 1 is a representation of the relation between the fine wire electrode of this invention and a moving web and an optional grounded conductor.

Referring to FIG. 1, web of dielectric material 10 is moved in the direction of the arrow and is wound onto take-up roll 11. The web 10, by virtue of its handling history bears an electrostatic charge prior to passing under fine wire electrode 12. Wire electrode 12 is located parallel with the surface of web 10, is spaced 0.6 to 8.0 cm (¼ to 3 inches) from web 10, and extends thereacross. Electrode 12 bears an electrical potential impressed from transformer source 13a having, for example, a primary side powered by a 110 volt AC at 60 Hertz to a secondary side providing 3000 to 10,000 volts. Voltage to transformer source 13a is supplied from commercial line current and can be controlled or adjusted by means of a variable voltage transformer 13b. The voltage on electrode 12 is adjusted to be less than that voltage which would cause spontaneous spark discharge but more than the voltage required to initiate corona discharge. Optional, grounded conductor 14 is located parallel and coextensive with electrode 12 and is spaced 0.6 to 8.0 cm (¼ to 3 inches) from web 10 and about 0.6 to 8.0 cm (¼ to 3 inches) from electrode 12.

Figure 2:
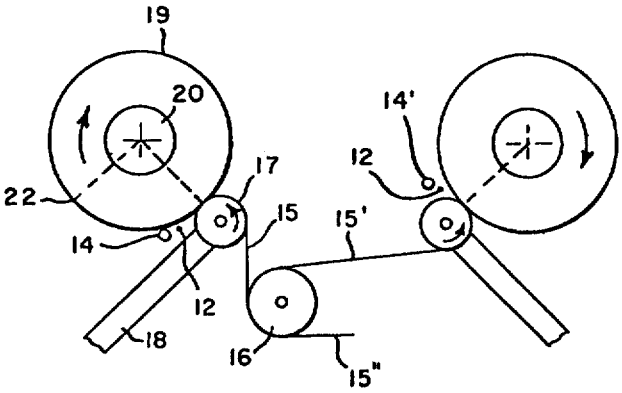
FIG. 2 is a representation of this invention as it relates to a slit web winding device.

Referring to FIG. 2, slit web 15'' moves around platen roll 16 and individual webs 15 and 15' advance to nip rolls 17 carried on pivotal arms 18 (equivalent elements on the right hand winding assembly are not numbered). The nip rolls 17 make pressure contact with wind-ups 19 wound on cores 20 and individual webs 15 and 15' are rolled onto the wind-ups. Electrostatic charge is generated when the dielectric web moves past a roll 16 or through nips 21. To make a charge neutralized wind-up, the charge should be continually neutralized at a location on the wind-up between the nips 21 and points around the wind-ups 22 less than 90° from the nip. Neuralization of the charge is accomplished within the angle to avoid establishment of a charge of reversed polarity on the wind-up surface. Prompt neutralization does not give time for establishment of such charges. It is preferred that the charge should be neutralized within an angle of 9° to 45° from the nip. In FIG. 2, wire electrodes 12 and 12' and grounded conductors 14 and 14' are diagrammatically shown to be located within the preferred 45° angle. Voltage source and ground connection for wire electrodes and grounded conductors are similar to those of FIG. 1. Wire electrodes and grounded conductors are mounted to pivotal arms 18. As wind-ups 19 increase in size, the electrodes and the conductors remain approximately the same distance from the periphery of the wind-ups.

This invention can be used to neutralize static charge on any moving web of dielectric material. Examples of such material include fibrous materials such as paper, fabrics, spun-bonded synthetics and the like and nonfibrous materials such as regenerated cellulose, films of synthetic polymers, and the like. The invention is used to particular advantage on webs of polyester, polyimide, and polyolefin film material. Such synthetic polymeric materials show a high degree of static charge retention and this invention, with its improved static charge neutralization, provides particularly good results. The invention has been found to operate especially effectively on webs of polyethylene terephthalate.

The fine wire electrode can be made from any conductive material of suitable tensile strength. Stainless steel is preferred. The wire must be bare and care must be exercised to keep the wire free from insulating contamination during operation. The bare wire is necessary because it must discharge ions on contact and, to the extent that the wire is insulated, ions cannot make contact with it. The fine wire electrode is generally of round cross section but such is not necessary. The wire should be of a diameter less than about 0.030 cm (12 mils) and less than about 0.025 cm (10 mils) is preferred. The charge neutralizer operates more effectively as the wire diameter is reduced, however, the lower limit for wire diameter is a matter of the tensile strength of the wire. The wire diameter should be large enough at the tensile strength of the wire material selected, to permit taut spans of wire across the web of material. The wire is usually greater than 0.010 cm (4 mils) in diameter.

The grounded conductor is optional to practice of this invention, however, when used results are somewhat improved. The ground is located away from the fine wire electrode in the direction of web travel and can be a rod of conductive material. Uninsulated stainless steel rod about one-fourth inch in diameter has been used with good results. A grounded conductor is useful to ensure that a ground exists on the same side of the moving web as the fine wire electrode. It is important that some ground is present during static charge neutralization and that it is located in an unobstructed line from the fine wire electrode.

The voltage source is commercial AC, generally 60 Hertz, adjusted by means of a transformer. Voltage is established at a level which is adequate to initiate corona discharge. Because the fine wire electrode is bare and substantially unshielded, the corona discharge subtends a wide angle of influence and is capable of neutralizing a relatively large band across the moving web of material at any given instant. Operation of this invention is effective on webs of material moving at least as fast as 11 m/sec (700 yards per minute). There is no lower limit for web speed. The invention effectively neutralizes a stationary web.

In neutralizing tests utilizing a slit web winding device similar to that depicted in FIG. 2, wind-ups of polyethylene terephthalate film material 25 to 100 cm (10 to 40 inches) wide and 6.25 to 50.0 microns (0.25 to 2.0 mils) thick have been made with a residual static charge of less than 0.2 kilovolts at 5 cm (2 inches) from the film surface. (Residual static charge values stated hereafter are as determined 5 cm [2 inches] from the film surface). The fine wire electrodes were a tantalum alloy 0.015 cm (6 mils) in diameter. The tests were conducted at web speeds of 0–11 m/sec (0–700 yards/min) with the wire electrodes charged to 7000 to 8000 volts at 60 Hertz and located an average of 2.5 cm (1 inch) from the wind-up surface over the course of the winding process. When voltage to the wire electrodes was shut off, the wind-ups increased to a residual static charge of greater than 30 kilovolts. When the fine wire electrodes were located beyond 90° from the nip of the winding device, the residual static charge on similar sized wind-ups was greater than 8 kilovolts. The preferred distance for wire electrodes and grounded conductors from the web material is 1.25 to 5 cm (½ to 2 inches).

In comparison neutralizing tests using the same electrode charging voltage (6500 volts), fine wire electrodes 0.020 cm (8 mils) in diameter resulted in wind-ups with 3 kilovolts residual static charge; electrodes 0.015 cm (6 mils) in diameter resulted in wind-ups with 1.5 kilovolts residual static charge; and electrodes 0.013 cm (5 mils) in diameter resulted in wind-ups with 0.3 kilovolts residual static charge.

In comparison neutralizing tests using 0.015 cm (6 mil) fine wire electrodes, electrode potential voltage of 8000 volts resulted in wind-ups with 0.3 kilovolts residual static charge and electrode potential voltage of 6500 volts resulted in wind-ups with 1.5 kilovolts residual static charge. The preferred fine wire electrode potential is 6000 to 9000 volts.

What is claimed is:

1. A web winding device for a dielectric web material comprising:
   - a driven winding roll onto which the web is wound;
   - a nip roll in pressure contact with the web wound on the winding roll and at which pressure contact the web is first laid onto the winding roll;
   - a conductive bare wire less than 0.03 cm in diameter extending across and parallel with the web and located 0.6 to 8 cm from the web on the winding roll in an arc of 0° to 90° after contact by the web with the winding roll; and
   - means for impressing an AC voltage on the wire of 3000 to 10,000 volts at 40 to 70 Hertz.

2. The device of claim 1 wherein the wire is greater than 0.010 cm in diameter.

3. The device of claim 1 wherein the wire is 1.25 to 5 cm from the web.

4. The device of claim 1 wherein the AC voltage is 6000 to 9000 volts.

5. The device of claim 1 wherein the wire is located in an arc of 0° to 45° after contact by the web with the winding roll.

6. The device of claim 1 wherein there is a grounded conductor, coextensive and parallel with the bare wire located 0.6 to 8 cm from the web away from the bare wire in the direction of web travel.

7. The device of claim 6 wherein the grounded conductor is 1.25 to 5 cm from the web.

[8. A static charge neutralizing device for dielectric web material comprising:
   - means for continuously moving the web material in a predetermined path;
   - conductive bare wire less than 0.03 cm in diameter extending across and parallel with the web material and located 0.6 to 8 cm from the web material; and
   - means for impressing an AC voltage on the wire of 3000 to 10,000 volts at 40 to 70 Hertz.]

[9. The device of claim 8 wherein the wire is greater than 0.010 cm in diameter.]

[10. The device of claim 8 wherein the wire is 1.25 to 5 cm from the web material.]

[11. The device of claim 8 wherein the AC voltage is 6000 to 9000 volts.]

[12. The device of claim 8 wherein there is a grounded conductor, coextensive and parallel with the bare wire, located 0.6 to 8 cm from the web away from the bare wire in the direction of web travel.]

[13. The device of claim 12 wherein the grounded conductor is 1.25 to 5 cm from the web material.]

[14. A process for continually neutralizing static charge on dielectric web material comprising:

moving the web material in a predetermined path 0.6 to 8 cm from a conductive bare wire less than 0.03 cm in diameter extending across and parallel with the web material and impressing an AC voltage on the wire of 3000 to 10,000 volts at 40 to 70 Hertz.]

[15. The process of claim 14 wherein the wire is greater than 0.010 cm in diameter.]

[16. The process of claim 14 wherein the wire is 1.25 to 5 cm from the web material.]

[17. The process of claim 14 wherein the AC voltage is 6000 to 9000 volts.]

[18. The process of claim 14 comprising the additional step of moving the web material 0.6 to 8 cm from a grounded conductor coextensive and parallel with the bare wire and located away from the bare wire in the direction of web travel.]

19. A process for winding and continually neutralizing static charge on dielectric web material comprising:

moving the web material onto a winding roll between the winding roll and a nip roll in pressure contact therewith and 0.6 to 8 cm from a conductive bare wire less than 0.03 cm in diameter extending across and parallel with the web material and located in an arc around the winding roll of 0° to 90° after contact by the web material with the winding roll and impressing an AC voltage on the wire 3000 to 10,000 volts at 40 to 70 Hertz.

20. The process of claim 19 wherein the wire is greater than 0.010 cm in diameter.

21. The process of claim 19 wherein the wire is 1.25 to 5 cm from the web material.

22. The process of claim 19 wherein the AC voltage is 6000 to 9000 volts.

23. The process of claim 19 comprising the additional step of moving the web material 0.6 to 8 cm from a grounded conductor coextensive and parallel with the bare wire and located away from the bare wire in the direction of web travel.

24. The process of claim 19 wherein the wire is located in an arc around the winding roll of 0° to 45°.

* * * * *